Nov. 12, 1940.  D. BERECK  2,221,466
ICE CREAM CONE DISPENSER
Filed Aug. 15, 1938  3 Sheets-Sheet 2
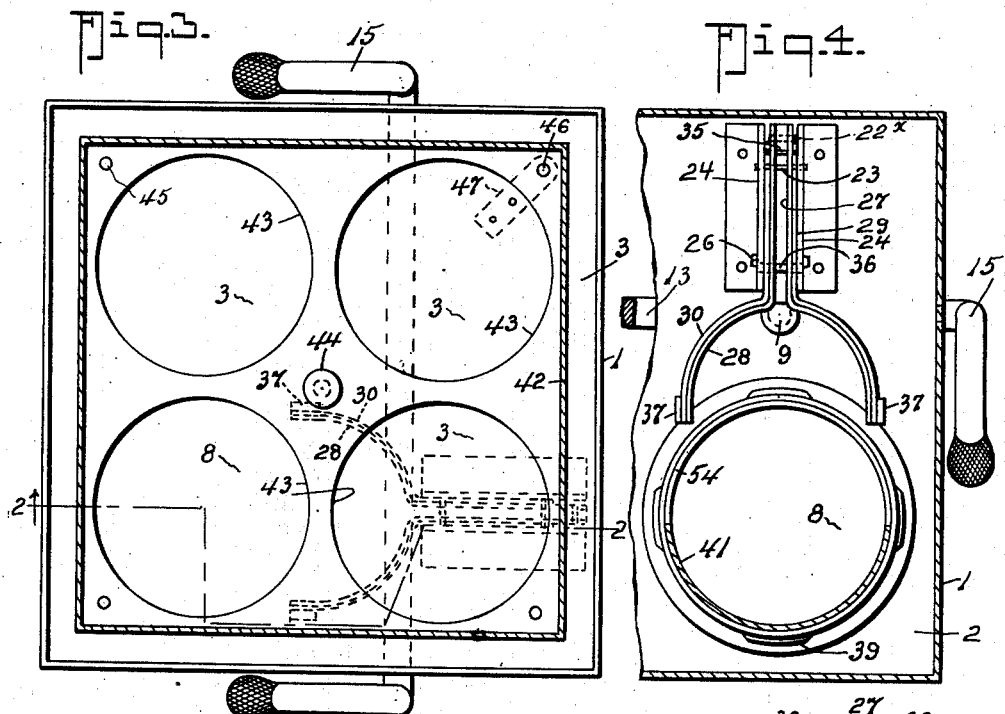
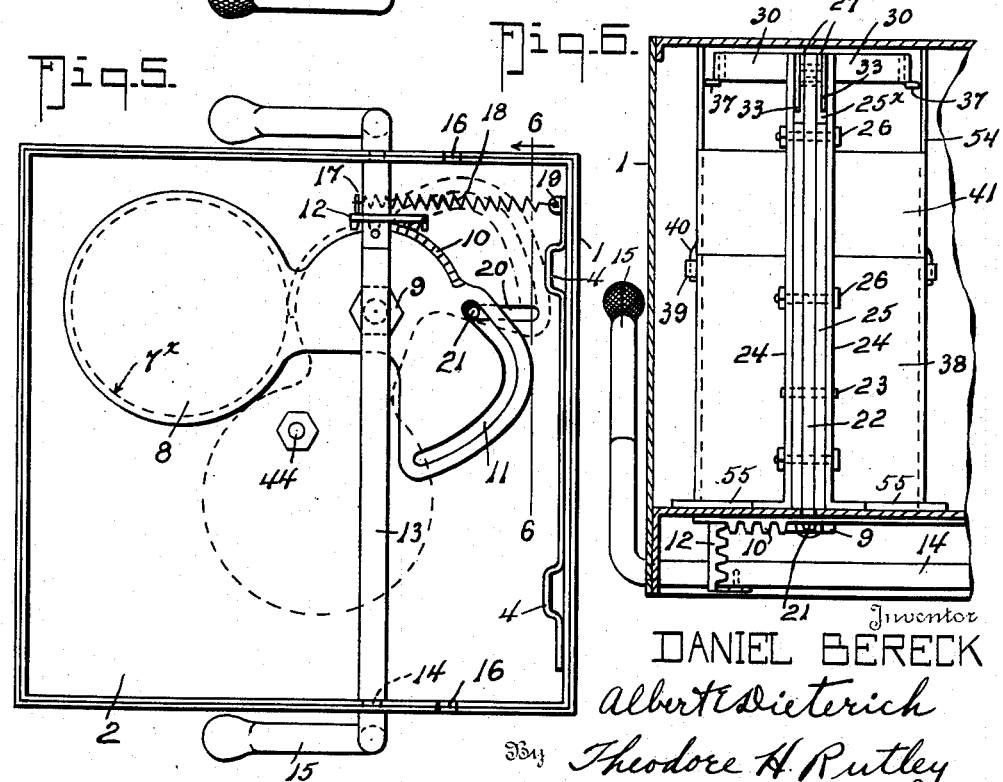

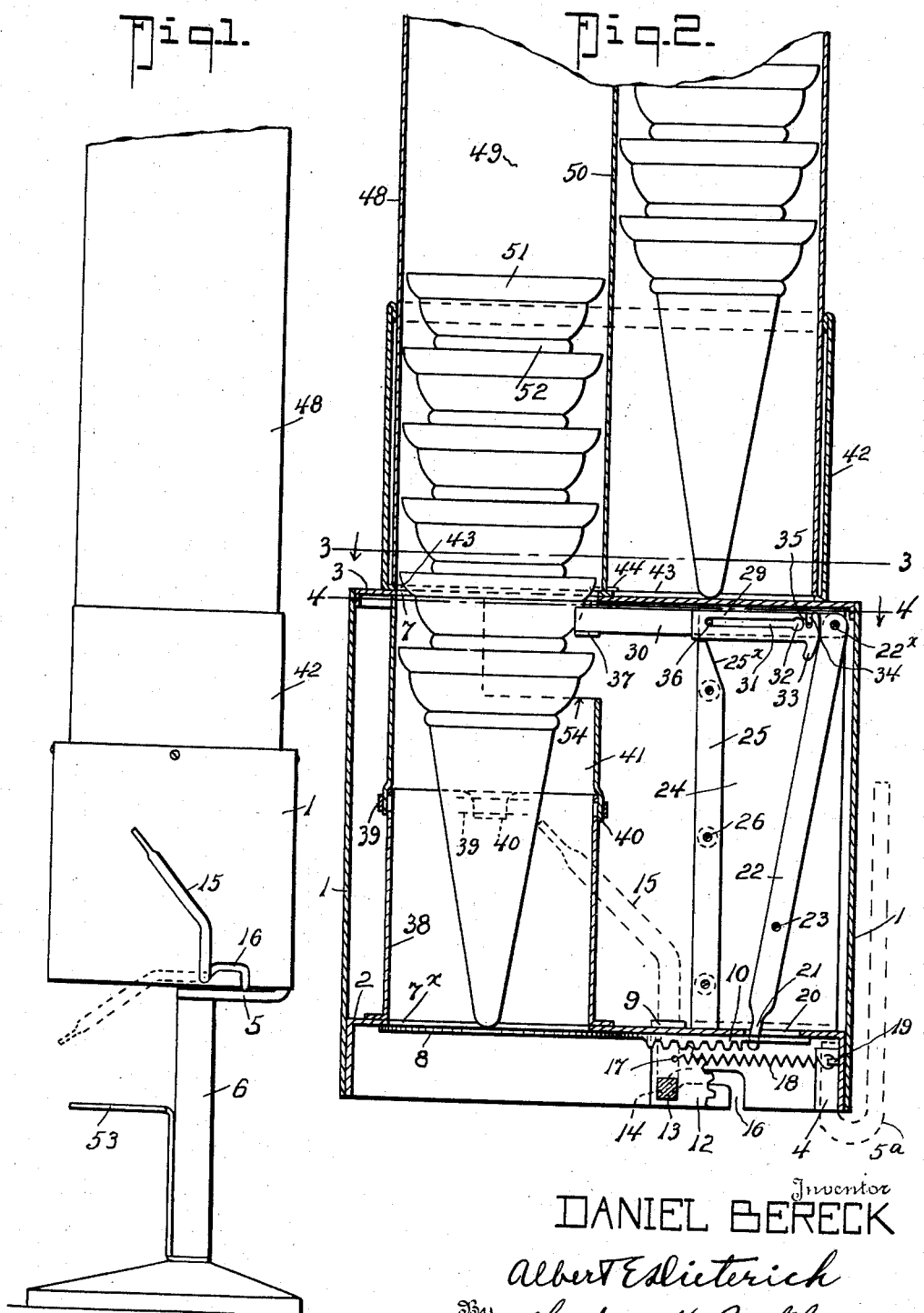

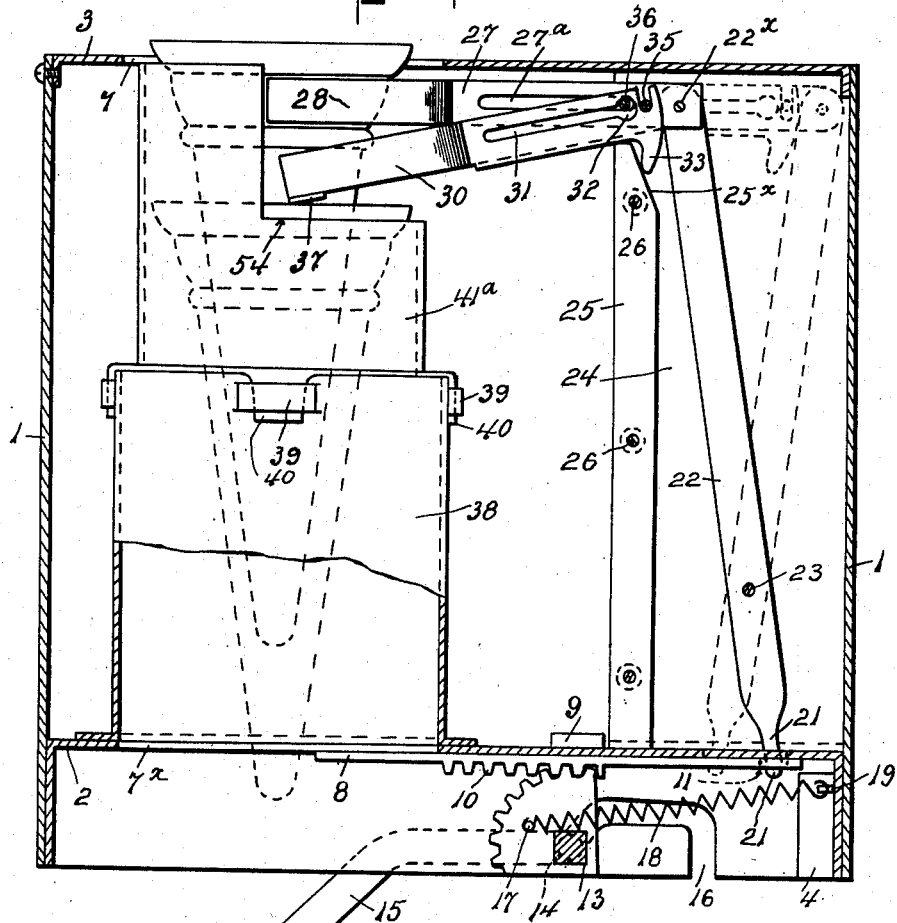
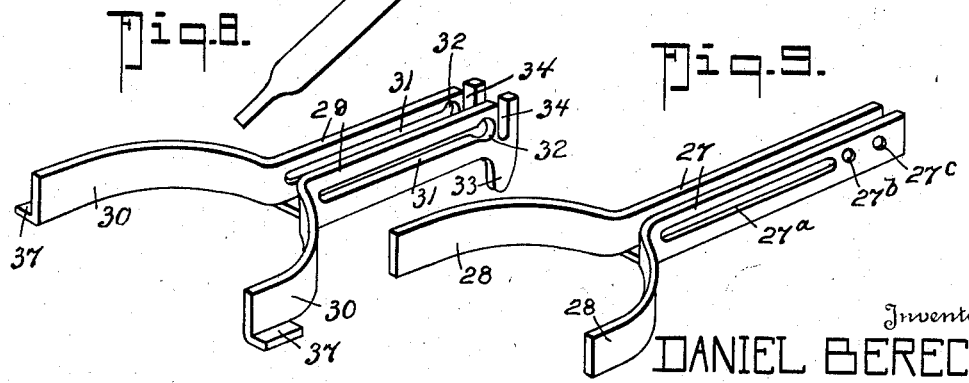

Patented Nov. 12, 1940

2,221,466

UNITED STATES PATENT OFFICE 2,221,466

ICE CREAM CONE DISPENSER

Daniel Bereck, Dayton, Ohio, assignor to James Balton, Baltimore, Md.

Application August 15, 1938, Serial No. 225,006

10 Claims. (Cl. 312—44)

The present invention relates to dispensing devices of the general type shown in my Letter Patent No. 1,743,092, issued January 14, 1930, and it particularly has for its object to simplify and improve the dispenser of said Letters Patent so as to reduce the cost of manufacture and to render the action more positive and with less likelihood of breaking the cones.

Further, it is an object to adapt a dispenser of the general type stated to the use of the boxes in which the cones are packed and shipped, as a part of the cone magazine of the dispenser.

Again, it is an object to provide a dispenser which can, by the simple exchange of a single part, be adapted to dispense cones of different diameter bowls or heads.

Further, it is an object to provide such a dispenser as can be readily mounted either on a pedestal or on a wall bracket with equal facility.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a side elevation of one embodiment of the invention mounted on a pedestal.

Fig. 2 is an enlarged vertical section on approximately the line 2—2 of Fig. 3, the near plate 24 being removed.

Fig. 3 is a horizontal section on the line 3—3 of Fig. 2.

Fig. 4 is a horizontal detail section on a part of the line 4—4 of Fig. 2.

Fig. 5 is a bottom plan view of the machine shown in Figs. 1 to 4, removed from the pedestal.

Fig. 6 is a detail rear elevation (casing in section) of the operating mechanism.

Fig. 7 is a larger view, partly in elevation and partly in section on approximately the line 2—2 of Fig. 3, but showing the position of the parts just after a cone has been dispensed.

Fig. 8 is a detail perspective view of the cone ejector.

Fig. 9 is a detail perspective view of the cone restrainer or holder.

In the drawings, in which like numbers of reference indicate like parts in all the figures, the base-housing is of rectangular form and is preferably constructed of sheet-metal vertical walls 1, a raised bottom 2 and a top 3. The top 3 and bottom 2 have aligning cone passages 7 and 7ˣ respectively (one in each, the top and bottom).

Beneath the bottom 2 are sockets 4 to receive the prongs of either a bracket 5 (pedestal) or 5ᵃ (wall). The bracket 5 is carried by a pedestal 6 which also supports a cone catcher 53 of any approved kind.

Under the bottom 2 is pivoted at 9 a gate 8 which normally closes the passage (hole) 7ˣ and holds up the stack of cones above the gate. This gate has a toothed segment 10 and a cam-slot 11, the former meshing with a toothed segment 12 on shaft 13 and the latter receiving the finger-end 21 of the lever 22. The shaft 13 is preferably of square form in cross section except for the bearings 14 which in assembling are passed to position through slots 16. The shaft 13 is bent parallel to the side walls, as at 15, and has its ends flattened to form finger pieces.

Attached to a pin 17 on segment 12, and to a lug 19, on the casing, is a return spring 18.

The finger end 21 also passes through a slot 20 in the bottom 2. The lever 22 is pivoted at 23 between the plates 24. In addition to the fixed pivot pin 23, the plates 24 carry a second fixed pin 36, hereinafter again referred to. A spacer 25 is secured firmly to and between the plates 24 by bolts 26 (or other suitable means) and the plates have their feet 55 secured firmly to the bottom 2. The spacer 25 has a beveled upper end 25ˣ serving as an abutment.

Pivotally connected to the rear end of a U-shaped bar-member 27 by a pin 22ˣ passing through holes 27ᶜ in the bar member, is the upper end of the lever 22. The rear end of 27 is bifurcated to receive the lever. At the front the bar 27 has two circular-arc arms 28 adapted to embrace a cone beneath its mouth rim and sustain the cone when the arms are projected forwardly into the cone-guiding tube 41. The bar 27 has longitudinal slots 27ᵃ through which the pin 36 passes. There are also holes 27ᵇ in which a pin 35 is carried by the bar 27. The bar 27 fits within another U-shaped bar 29 which also has curved arms 30 which lie outside the arms 28 and are provided with laterally projected cone-mouth-engaging fingers 37. The bar 29 has longitudinal slots 31 the rear extremities of which are somewhat enlarged, as at 32, for a purpose presently made clear.

The pin 36 also passes through the slots 31 while the pin 35, that is carried by the bar 27 in holes 27ᵇ, lies in vertical slots 34 in the bar 29. The bar 29 also has cam-heels 33 to cooperate with the beveled portion 25ˣ of the spacer 25 (see Fig. 7).

A lower tube 38 is secured to the bottom 2, permanently, over the hole 7ˣ and is of the diameter of that hole, i. e., large enough to receive the largest size cone that the machine is designed to dispense. The upper tube 41 (or 41ᵃ) has lugs 40 to fit in the straps 39 stamped in the tube 38. The upper tube 41 (41ᵃ) has a cutaway portion 54 in which the arms 28 and 30 work. The combined height of tubes 38—41 is that of the space between the top 3 and the bottom 2 (see Fig. 7). When the largest-head cones are to be dispensed, two tubes (38 and 41) will be of the same inside diameters (see Fig. 2), but when cones with smaller heads are to be dispensed an upper tube 41a of correspondingly smaller diameter will be used (see Fig. 7). When the smaller tubes 41a are used, the arms 30—28 are bent closer together, so as to operate properly on the smaller cones, than they are when they are to operate on the larger cones.

When the improved dispensing mechanism is to be used in dispensers where the shipping carton is to be used as the magazine, there is provided a shallow box 42 pivoted centrally at 44 to the top 3. The box 42 is of the same form as the carton 48 (usually square in cross section). It has one hole 43 in each quadrant for the discharge of the cones, but only one of such holes 43 registers at a time with hole 7. The box 42 also has four latch-holes 45 to receive the latch pin or bolt (preferably semi-spherical) 46 held by a leaf spring 47 riveted or otherwise secured to the top 3.

The carton 48 is divided into four cells by crossed partitions 49 and 50 (see Fig. 2) each cell containing a stack of cones 51. The cones usually have nesting rings 52 to prevent sticking of the cones together as much as possible. When one cell becomes empty the box 42 is turned 90° to bring the next cell into position to be dispensed.

*Operation*

Assume the parts to be positioned as shown in Figs. 1 to 6 inclusive, and refer particularly to Fig. 2. It will be seen that the left-hand stack of cones 51 is held up by the gate 8 and the cone hold-back arms 28 and the cone ejector arms 30 are drawn back and lie in the same horizontal levels.

Now when a cone is to be dispensed, the operator presses down on the lever-arms 15 to move the same from the position shown in Figs 1 and 2 to the position shown in Fig. 7. In doing so the toothed segment 12 is turned counter-clockwise in Fig. 2 and the gate 8 turned counter-clockwise in Fig. 5 to the position shown in dotted lines in Fig. 5, thereby freeing the cone stack of its support by the gate. However, before the gate has opened the hole 7x sufficiently to pass from under the tip of the lowermost cone, the arms 28 and 30 will have been projected forwardly so as to pass between the top edge of the lowermost cone and the mouth-rim of the next cone above.

As soon as the gate 8 has opened hole 7x and passed from beneath the cones, the final portion of the forward stroke of the lever 22 will bring heels 33 into contact with abutment 25x and rock arms 30 downwardly, thereby causing the lateral fingers 37 to press down on the mouth-rim of the lower cone and free it from the stack while the remainder of the stack is held up by arms 28 until, on the return movement of levers 15, the gate 8 is again brought beneath the points of the cones in closing the hole 7x. As soon as the gate has sufficiently closed under the hole 7x, the arms 28—30 will be withdrawn from the cones and the stack will drop until the point of the lowermost cone remaining in the stack rests on gate 8. This completes the operation cycle.

The parts of the dispenser proper (excluding the supporting pedestal 6 and brackets 5 or 5a), except the shaft, 13, may all be formed of sheet metal, largely by stamping operations, and thus the expense of manufacturing is reduced to a minimum.

By making the upper section 41—41a of the guide tube detachable from the lower section and making the top 3 detachable, the dispenser can be almost instantly converted for one size cones or another by simply exchanging the upper section 41—41a and pushing together or spreading apart the arms 28—30 the required amount for the size of the cone to be dispensed.

While I have described the machine as a cone dispenser, it is obvious that it may readily be designed to dispense other similarly shaped articles such as pastry cups, paper drinking cups, etc.

From the foregoing description, taken in connection with the accompanying drawings, it is thought that the construction, operation and advantages of the invention will be clear to those skilled in the art to which it relates.

What I claim is:

1. In a dispenser for ice cream cones and similar articles, a casing having a top and a bottom, said bottom having a discharge hole, a cone stack guide located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a fixed lower section and a detachable upper section and means to hold the upper section to the lower section against rotation.

2. In a dispenser for ice cream cones and similar articles, a casing having a top and a bottom, said bottom having a discharge hole, a cone stack guide located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a fixed lower section and a detachable upper section and means to hold the upper section to the lower section against rotation, said upper section having a cut-out portion to admit said cone release effecting and hold up means.

3. In a dispenser for ice cream cones and similar articles, a casing having a top and a bottom, said bottom having a discharge hole, a cone stack guide located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a tube having a cutaway portion to admit said cone release effecting and hold up means.

4. In a dispenser for ice cream cones and similar articles, a casing having a top and a bottom, said bottom having a discharge hole, a cone stack guide located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a tube having a cut-away portion to admit said cone release effecting and hold up means, said cone release effecting and hold up means including two nested channel-bars each having arms for embracing the cones in the stack, means to reciprocate said bars to project said arms into and withdraw the same from said cut-away portion and means to rock one of said bars with its arms downwardly when projected so as to eject the lowermost cone from the stack.

5. In a dispenser for ice cream cones and similar articles, a casing having a top and a bottom, said bottom having a discharge hole, a cone stack guide, located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a tube having a cut-away portion to admit said cone release effecting and hold up means, said cone release effecting and hold up means including a lever pivotally mounted intermediate its ends in said casing and having a finger at its lower end, said gate being pivotally mounted and having a cam-slot to receive said finger and to rock the same as the gate is turned, a pair of bars each having cone-embracing arms mounted in the casing in position to be reciprocated toward and from said cone stack guide, means connecting said bars with the upper end of said lever, one of said bars being pivotally mounted on the other bar, means to guide said bars to be projected in unison during the major portion of their travel, and means operating near the end of the forward stroke of said bars for rocking said pivotally mounted bar to lower its arms into pressure contact with the mouth-rim of the lowermost cone in the stack while the arms of the other bar remain in position to hold back the remaining cones in the stack.

6. In a dispenser for ice cream cones and similar articles in which is provided a casing having a top and a bottom and containing cone dispensing mechanism, the top having an opening for the insertion of cones into the dispensing mechanism, and the bottom having a discharge hole, a box-like holder rotatably mounted on a vertical axis on top of said casing, said holder having discharge holes in its bottom symmetrically disposed around its axis, a carton with an open end fitted in said holder and having cells to contain the stacks of cones, the carton serving as a cone magazine in cooperation with said holder and being provided with means for supporting stacks of cones, one stack in alignment with each discharge hole in the holder's bottom, said holes being closed by the top of said casing except when the holes are in direct alignment with the opening in the top of the casing.

7. In a machine of the character described wherein is provided a casing having a top and a bottom, said top having a receiving hole and said bottom having a discharging hole; a carton holder rotatably mounted on top of said casing, a carton divided by partitions into several cells disposed concentrically with the axis of said carton holder and held in place by said holder, said holder being of less depth than said carton, whereby the carton acts as the cone magazine, and means to hold said holder in position on said casing with one cell of the carton in line with the receiving hole of said casing.

8. In a dispenser for ice cream cones and similar articles, a casing having a top and a bottom, said bottom having a discharge hole, a cone stack guide located within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said cone stack guide comprising a fixed lower section and a detachable upper section and means to hold the upper section to the lower section against rotation, said upper section being of lesser diameter than said lower section.

9. In a dispenser for ice cream cones and similar articles, a casing having a top and a bottom, said bottom having a discharge hole, a cone stack guide within the casing through which the cones are passed to said discharge hole, said top having an opening for the insertion of cones in the cone stack guide, a gate closing said hole, means to move said gate to uncover said hole, and means operable in harmony with the gate movements to effect a release of the bottom cone of the stack and hold up the remainder when the gate has uncovered said hole, said last named means including two nested channeled bars each having arcuate cone-embracing arms and means to project said bars forwardly in unison during a portion of their movement and then move the arms of one bar downwardly to release a cone while the arms of the other bar remain in position to hold back the remainder of the stack.

10. In a dispenser for ice cream cones and similar articles, a support having a bottom, said bottom having a discharge hole, a cone stack guide located on said support over said hole through which the cones are passed to said discharge hole, a gate closing said hole, means to move said gate to uncover said hole, and means operable in harmony with the gate movements to effect a release of the bottom cone of the stack and hold up the remainder when the gate has uncovered said hole, said cone stack guide comprising a tubular body having an opening to admit said cone release effecting and hold up means, said cone release effecting and hold up means including two nested channel-bars each having arms for embracing the cones in the stack, means to reciprocate said bars to project said arms into and withdraw the same from said opening, and means to rock one of said bars with its arms downwardly when projected so as to eject the lowermost cone from the stack.

DAN BERECK.